US010657830B2

(12) United States Patent
Gordon et al.

(10) Patent No.: US 10,657,830 B2
(45) Date of Patent: May 19, 2020

(54) OPERATION OF AN AERIAL DRONE INSIDE AN EXCLUSION ZONE

(71) Applicant: International Business Machines Corporation, Armonk, NY (US)

(72) Inventors: Michael S. Gordon, Yorktown Heights, NY (US); James R. Kozloski, New Fairfield, CT (US); Ashish Kundu, New York, NY (US); Peter K. Malkin, Ardsley, NY (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 638 days.

(21) Appl. No.: 15/082,176

(22) Filed: Mar. 28, 2016

(65) Prior Publication Data
US 2017/0278404 A1    Sep. 28, 2017

(51) Int. Cl.
| | | |
|---|---|---|
| *G08G 5/00* | (2006.01) | |
| *B64C 39/02* | (2006.01) | |
| *G05D 1/00* | (2006.01) | |
| *G05D 1/10* | (2006.01) | |
| *G06F 21/00* | (2013.01) | |

(52) U.S. Cl.
CPC ............ *G08G 5/006* (2013.01); *B64C 39/024* (2013.01); *G05D 1/101* (2013.01); *G05D 1/106* (2019.05); *G06F 21/00* (2013.01); *G08G 5/0013* (2013.01); *G08G 5/0069* (2013.01); *B64C 2201/14* (2013.01)

(58) Field of Classification Search
CPC ...... G05D 1/0011; G05D 1/101; G06F 21/00; H04W 4/046
See application file for complete search history.

(56) References Cited

U.S. PATENT DOCUMENTS

| | | | |
|---|---|---|---|
| 9,087,451 B1 | 7/2015 | Jarrell | |
| 10,168,700 B2 * | 1/2019 | Gordon | ............... G05D 1/0016 |
| 10,301,024 B1 * | 5/2019 | Sopper | ..................... B64D 1/22 |
| 2004/0249519 A1 | 12/2004 | Frink | |

(Continued)

FOREIGN PATENT DOCUMENTS

| | | | | |
|---|---|---|---|---|
| WO | 2007063070 | | 6/2007 | |
| WO | WO-2016154942 A1 * | 10/2016 | | ............. B64C 39/00 |

OTHER PUBLICATIONS

P. Mell et al., "The Nist Definition of Cloud Computing", National Institute of Standards and Technology, Information Technology Laboratory, Sep. 2011, pp. 1-7.

(Continued)

*Primary Examiner* — Peter D Nolan
*Assistant Examiner* — Ce Li Li
(74) *Attorney, Agent, or Firm* — Law Office of Jim Boice

(57) ABSTRACT

A method, system, and/or computer program product controls operations of an aerial drone within a predetermined airspace. A drone controller device detects a presence of an aerial drone. The drone controller device and the aerial drone negotiate permission to fly within a predetermined airspace under a predefined aerial drone state. In response to successfully negotiating the permission, the drone controller device enables a drone on-board computer to operate the aerial drone within the predetermined airspace in accordance with the predefined aerial drone state.

12 Claims, 7 Drawing Sheets

(56) References Cited

U.S. PATENT DOCUMENTS

| | | | |
|---|---|---|---|
| 2010/0084513 A1 | 4/2010 | Gariepy et al. | |
| 2014/0018979 A1 | 1/2014 | Goossen et al. | |
| 2014/0149244 A1* | 5/2014 | Abhyanker | G06Q 10/087 705/26.2 |
| 2015/0193936 A1* | 7/2015 | Warzelhan | G08B 13/19608 382/103 |
| 2015/0242648 A1* | 8/2015 | Lemmey | G06F 21/62 726/30 |
| 2015/0242972 A1* | 8/2015 | Lemmey | G06F 21/62 705/80 |
| 2015/0254988 A1 | 9/2015 | Wang et al. | |
| 2015/0336270 A1 | 11/2015 | Storr | |
| 2015/0339931 A1 | 11/2015 | Yu et al. | |
| 2015/0339933 A1 | 11/2015 | Batla et al. | |
| 2016/0117931 A1* | 4/2016 | Chan | G08G 5/0043 701/120 |
| 2016/0189550 A1* | 6/2016 | Chan | G08G 5/0043 701/3 |
| 2016/0253907 A1* | 9/2016 | Taveira | G08G 5/006 701/3 |
| 2017/0106986 A1* | 4/2017 | Sweeny | B64C 25/58 |
| 2017/0219676 A1* | 8/2017 | Tran | H04W 12/02 |
| 2018/0068567 A1* | 3/2018 | Gong | H04W 4/022 |
| 2018/0293898 A1* | 10/2018 | Redmann | G08G 5/0013 |

OTHER PUBLICATIONS

M. Burgess, "Delivery Drones Will Need No-Fly Zones to Keep Our Skies Safe", Conde Nast UK, Wired Retail 2015, Nov. 23, 2015, pp. 1-3.

L. Newman, "Here's How to Set Up a No-Fly Drone Zone Over Your House", The Slate Group LLC, Slate, Future Tense, Feb. 10, 2015, pp. 1-4.

* cited by examiner

OPERATION OF AN AERIAL DRONE INSIDE AN EXCLUSION ZONE

BACKGROUND

The present disclosure relates to the field of aerial drones. More specifically, the present disclosure relates to adjusting operations of an aerial drone while inside an exclusion zone, such as a restricted airspace.

An aerial drone is an unmanned aircraft, also known as an unmanned aerial vehicle (UAV). That is, an aerial drone is an airborne vehicle that is capable of being piloted without an on-board human pilot. If autonomously controlled using an on-board computer and pre-programmed instructions, a UAV is called an autonomous drone. If remotely piloted by a human pilot, the UAV is called a remotely piloted aircraft (RPA).

SUMMARY

A method, system, and/or computer program product controls operations of an aerial drone within a predetermined airspace. A drone controller device detects a presence of an aerial drone. The drone controller device and the aerial drone negotiate permission to fly within a predetermined airspace under a predefined aerial drone state. In response to successfully negotiating the permission, the drone controller device enables a drone on-board computer to operate the aerial drone within the predetermined airspace in accordance within the predefined aerial drone state.

DETAILED DESCRIPTION

Figure 1:
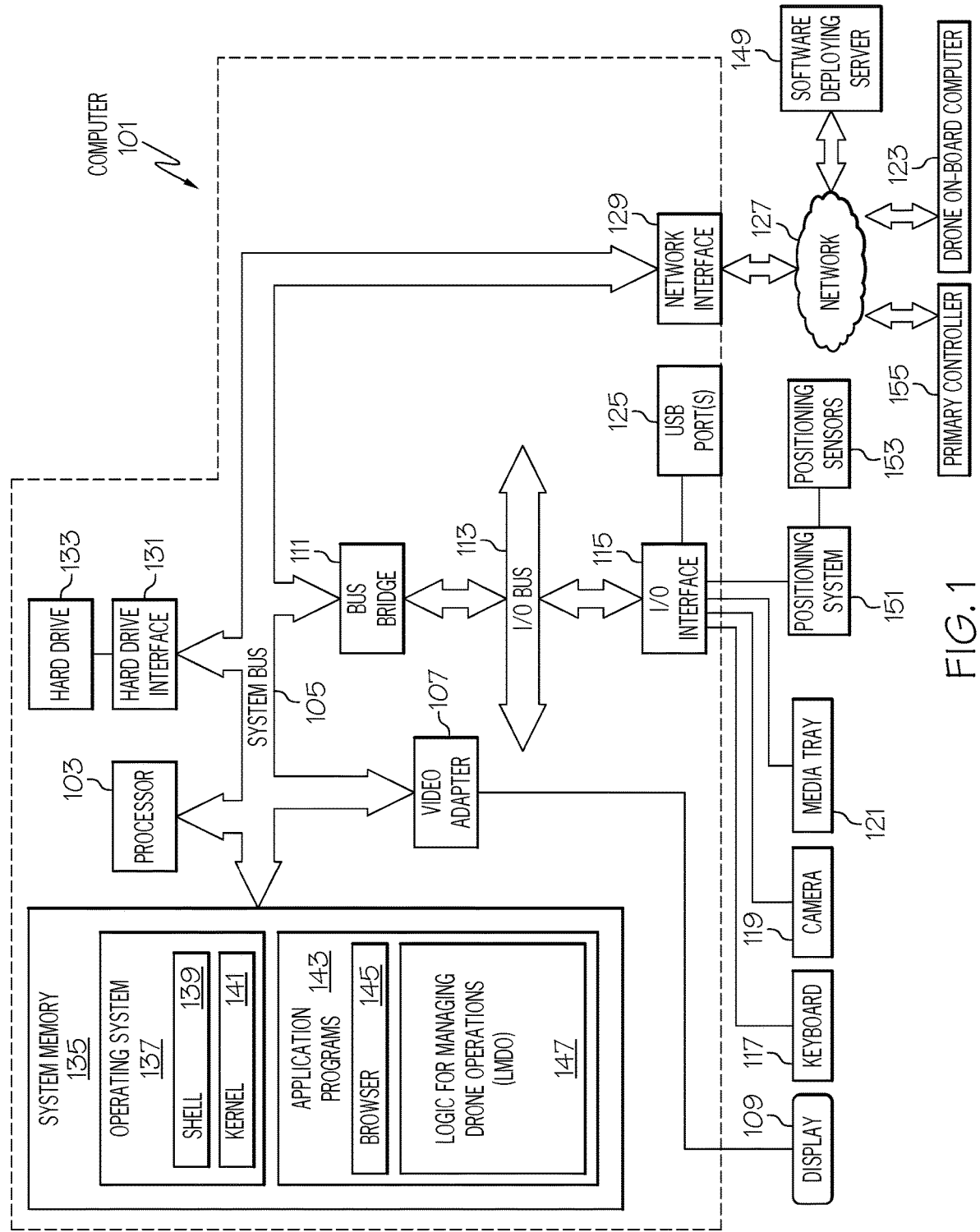
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by drone on-board computer 123 and/or positioning system 151 and/or primary controller 155 shown in FIG. 1, and/or drone on-board computer 223 shown in FIG. 2, and/or drone on-board computer 323 shown in FIG. 3, and/or drone controller device 401 and/or primary controller 455 shown in FIG. 4.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a camera 119 (i.e., a digital camera capable of capturing still and moving images), a media tray 121 (which may include storage devices such as CD-ROM drives, multi-media interfaces, etc.), and external USB port(s) 125. While the format of the ports connected to I/O interface 115 may be any known to those skilled in the art of computer architecture, in one embodiment some or all of these ports are universal serial bus (USB) ports.

Also coupled to I/O interface 115 is a positioning system 151, which determines a position of computer 101 and/or other devices using positioning sensors 153. Positioning sensors 153 may be any type of sensors that are able to determine a position of a device, including computer 101, an aerial drone 200 shown in FIG. 2, etc. Positioning sensors 153 may utilize, without limitation, satellite based positioning devices (e.g., global positioning system—GPS based devices), accelerometers (to measure change in movement), barometers (to measure changes in altitude), etc.

As depicted, computer 101 is able to communicate with a software deploying server 149 and/or other devices/systems (e.g., drone on-board computer 123 and/or a software deploying server 149 and/or a primary controller 155) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory also include Logic for Managing Drone Operations (LMDO) 147. LMDO 147 includes code for implementing the processes described below, including those described in FIGS. 2-5. In one embodiment, computer 101 is able to download LMDO 147 from software deploying server 149, including in an on-demand basis. In one embodiment, software deploying server 149 is able to execute one or more instructions from LMDO 147 and provide the results to computer 101, thus relieving computer 101 from the need to utilize its internal processing power.

A primary controller 155 is able to communicate with computer 101 via network 127. Primary controller 155 is a wireless controller that controls an aerial drone (e.g., aerial drone 200 shown in FIG. 2) either autonomously or under the instructions/input entered by a user of the primary controller 155.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
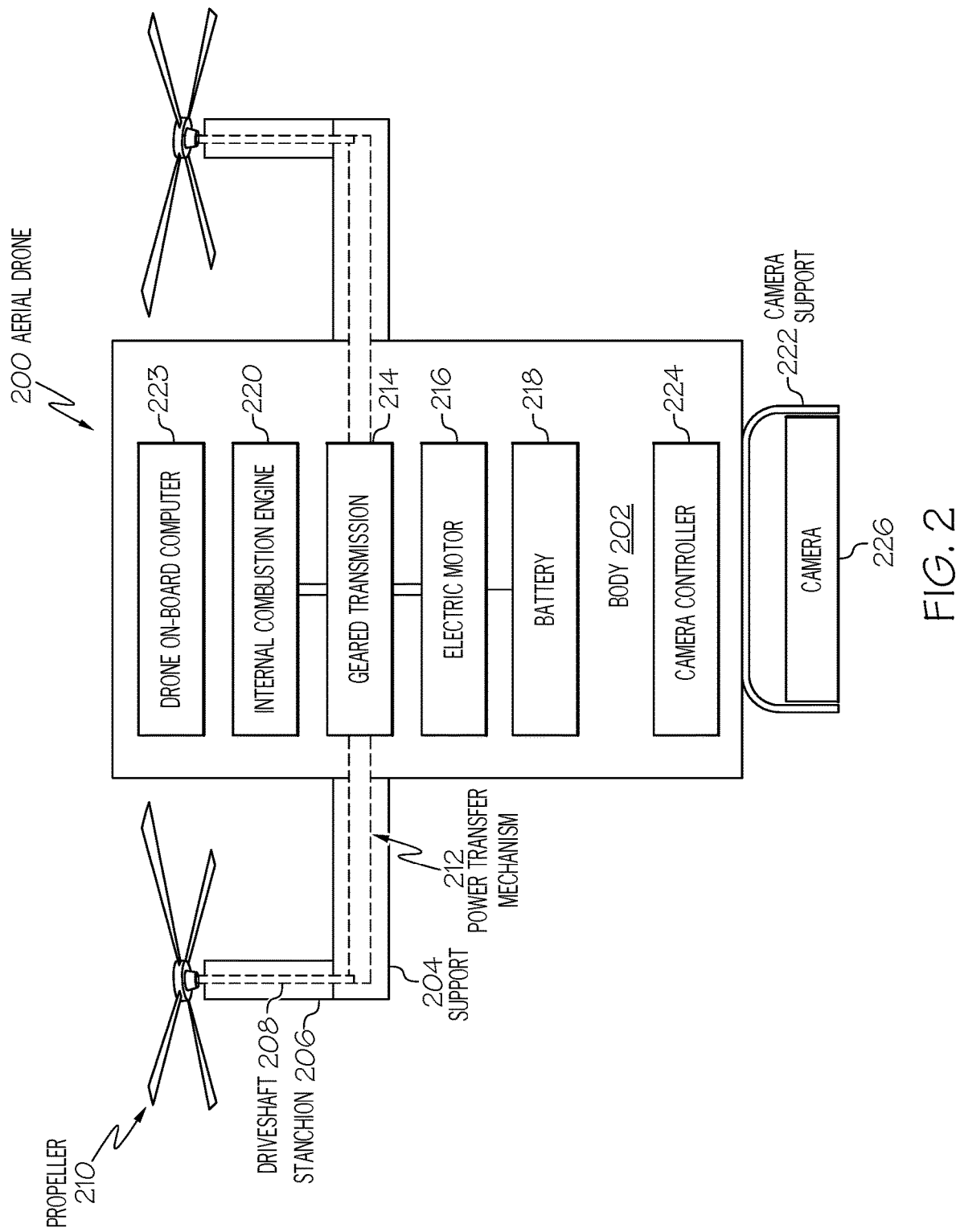
FIG. 2 depicts additional detail of an exemplary aerial drone in accordance with one or more embodiments of the present invention.

FIG. 2 illustrates an exemplary aerial drone 200 in accordance with one or more embodiments of the present invention. The terms "aerial drone", "drone", and "unmanned aerial vehicle" ("UAV") are used interchangeably herein to identify and describe an airborne vehicle that is capable of pilot-less flight.

As shown in FIG. 2, aerial drone 200 includes a body 202, which is attached to supports such as support 204. Supports such as support 204 support stanchions such as stanchion 206. Such stanchions provide a housing for a driveshaft within each of the stanchions, such as the depicted driveshaft 208 within stanchion 206. These driveshafts are connected to propellers. For example, driveshaft 208 within stanchion 206 is connected to propeller 210.

A power transfer mechanism 212 (e.g., a chain, a primary driveshaft, etc.) transfers power from a geared transmission 214 to the driveshafts within the stanchions (e.g., from geared transmission 214 to the driveshaft 208 inside stanchion 206), such that propeller 210 is turned, thus providing lift and steering to the aerial drone 200. Geared transmission 214 preferably contains a plurality of gears, such that a gear ratio inside geared transmission 214 can be selectively changed.

Power to the geared transmission 214 is selectively provided by an electric motor 216 (which is supplied with electrical power by a battery 218) or an internal combustion engine 220, which burns fuel from a fuel tank (not shown). In one or more embodiments of the present invention, the internal combustion engine 220 has greater power than the electric motor 216, since internal combustion engines are able to produce greater torque/power and have a greater range (can fly farther) than electric motors of the same size/weight.

Affixed to the bottom of body 202 is a camera support 222 that holds a camera 226. A camera controller 224 is able to aim, focus, etc. camera 226 under the control of the drone on-board computer 223.

Figure 3:
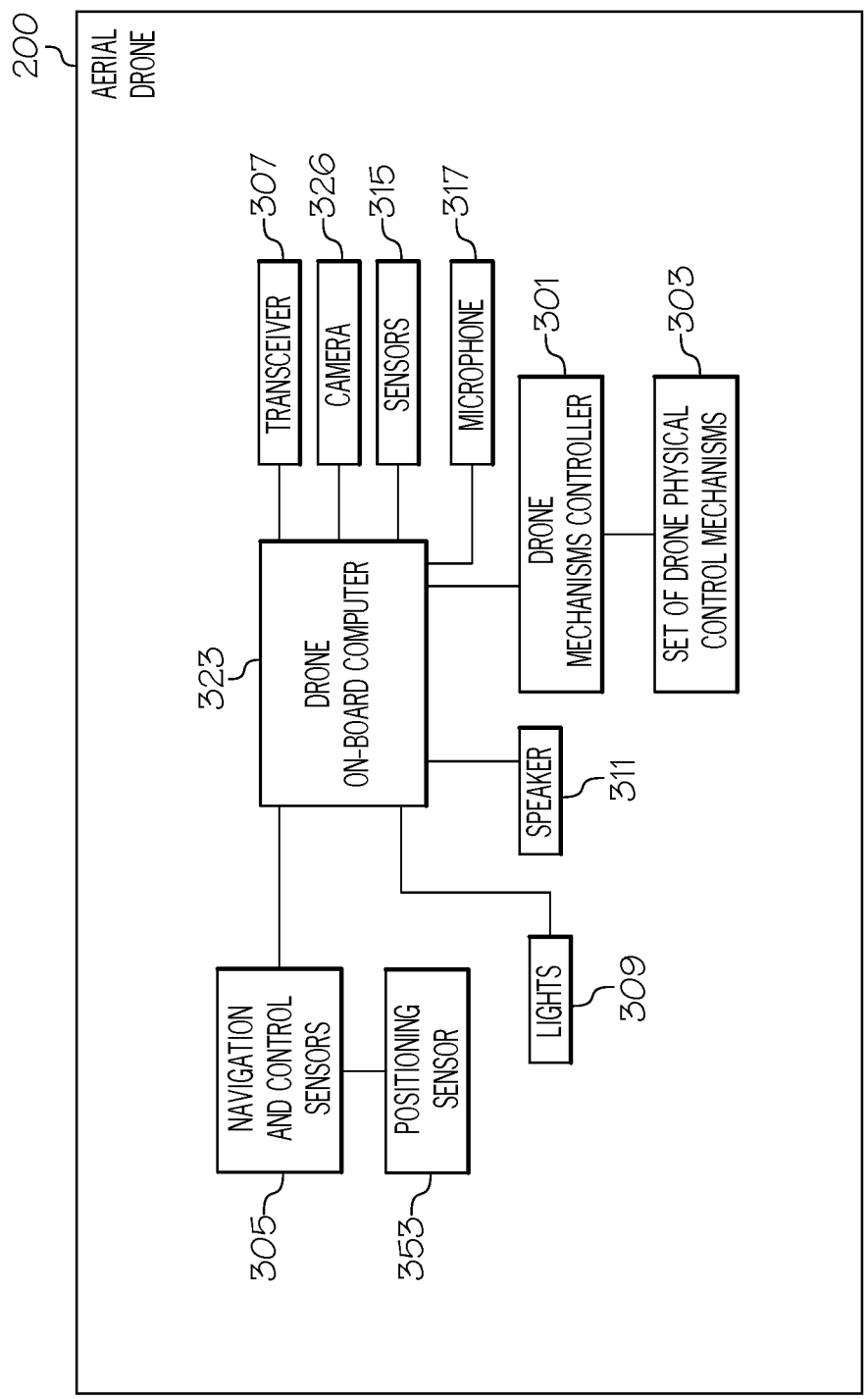
FIG. 3 illustrates control hardware and other hardware features of an exemplary aerial drone in accordance with one or more embodiments of the present invention.

With reference now to FIG. 3, exemplary control hardware within the aerial drone 200 presented in FIG. 2 is depicted.

A drone on-board computer 323 (analogous to drone on-board computer 223 shown in FIG. 2) controls a drone mechanisms controller 301, which is a computing device that controls a set of drone physical control mechanisms 303. The set of drone physical control mechanisms 303 includes, but is not limited to, throttles for internal combustion engine 220 and/or electric motor 216, selectors for selecting gear ratios within the geared transmission 214, controls for adjusting the pitch, roll, and angle of attack of propellers such as propeller 210 and other controls used to control the operation and movement of the aerial drone 200 depicted in FIG. 2.

Whether in autonomous mode or remotely-piloted mode, the drone on-board computer 323 controls the operation of aerial drone 200. This control includes the use of outputs from navigation and control sensors 305 to control the aerial drone 200. Navigation and control sensors 305 include hardware sensors that (1) determine the location of the aerial drone 200; (2) sense other aerial drones and/or obstacles and/or physical structures around aerial drone 200; (3) measure the speed and direction of the aerial drone 200; and (4) provide any other inputs needed to safely control the movement of the aerial drone 200.

With respect to the feature of (1) determining the location of the aerial drone 200, this is achieved in one or more embodiments of the present invention through the use of a positioning system such as positioning system 151 (shown in FIG. 1), which may be part of the drone on-board computer 323, combined with positioning sensor 353. Positioning system 151 may use a global positioning system (GPS), which uses space-based satellites that provide positioning signals that are triangulated by a GPS receiver to determine a 3-D geophysical position of the aerial drone 200. Positioning system 151 may also use, either alone or in conjunction with a GPS system, physical movement sensors such as accelerometers (which measure changes in direction and/or speed by an aerial drone in any direction in any of three dimensions), speedometers (which measure the instantaneous speed of an aerial drone), air-flow meters (which measure the flow of air around an aerial drone), barometers (which measure altitude changes by the aerial drone), etc. Such physical movement sensors may incorporate the use of semiconductor strain gauges, electromechanical gauges that take readings from drivetrain rotations, barometric sensors, etc.

With respect to the feature of (2) sensing other aerial drones and/or obstacles and/or physical structures around aerial drone 200, the drone on-board computer 323 may utilize radar or other electromagnetic energy that is emitted from an electromagnetic radiation transmitter (e.g., transceiver 307 shown in FIG. 3), bounced off a physical structure (e.g., a building, bridge, or another aerial drone), and then received by an electromagnetic radiation receiver (e.g., transceiver 307). By measuring the time it takes to receive back the emitted electromagnetic radiation, and/or evaluating a Doppler shift (i.e., a change in frequency to the electromagnetic radiation that is caused by the relative movement of the aerial drone 200 to objects being interrogated by the electromagnetic radiation) in the received electromagnetic radiation from when it was transmitted, the presence and location of other physical objects can be ascertained by the drone on-board computer 323.

With respect to the feature of (3) measuring the speed and direction of the aerial drone 200, this is accomplished in one or more embodiments of the present invention by taking readings from an on-board airspeed indicator (not depicted) on the aerial drone 200 and/or detecting movements to the control mechanisms (depicted in FIG. 2) on the aerial drone 200 and/or the positioning system 151 discussed above.

With respect to the feature of (4) providing any other inputs needed to safely control the movement of the aerial drone 200, such inputs include, but are not limited to, control signals to direct the aerial drone 200 to make an emergency landing, etc.

Also on aerial drone 200 in one or more embodiments of the present invention is a camera 326, which is capable of sending still or moving visible light digital photographic images (and/or infrared light digital photographic images) to the drone on-board computer 323. These images can be used to determine the location of the aerial drone 200 (e.g., by matching to known landmarks), to sense other drones/obstacles, and/or to determine speed (by tracking changes to images passing by) of the aerial drone.

Also on aerial drone 200 in one or more embodiments of the present invention are sensors 315. Examples of sensors 315 include, but are not limited to, air pressure gauges, microphones, barometers, chemical sensors, vibration sensors, etc., which detect a real-time operational condition of aerial drone 200 and/or an environment around aerial drone 200. Another example of a sensor from sensors 315 is a light sensor, which is able to detect light from other drones, street lights, home lights, etc., in order to ascertain the environment in which the aerial drone 200 is operating.

Also on aerial drone 200 in one or more embodiments of the present invention are lights 309. Lights 309 are activated by drone on-board computer 323 to provide visual warnings, alerts, etc. as described herein.

Also on aerial drone 200 in one or more embodiments of the present invention is a speaker 311. Speaker 311 is used by drone on-board computer 323 to provide aural warnings, alerts, etc.

Also on aerial drone 200 in one or more embodiments of the present invention is a microphone 317. In an embodiment, microphone 317 is an omnidirectional sensor that measures ambient noise (e.g., sound produced by the aerial drone 200). In the same or another embodiment, microphone 317 is a directional microphone (e.g., that captures sounds at some distance away from the aerial drone 200).

Described herein in one or more embodiments is a system and method to establish a communicative coupling between a drone and a drone-exclusion zone system so as to authenticate the drone's ability/permission/authorization/authentication required to access an exclusion zone and to take an action based on the drone piercing a boundary in space (e.g. charging a fee, offering a reward, etc.). Authentication may be based on a key, a drone identifier, context, a payment, or an analysis of the drone in accordance with the exclusion zone. This functions, in part, as a "drone firewall".

Drone exclusion zones are zones in which the flight of aerial drones are prohibited and/or restricted. For example, places such as airports, military establishments, and outdoor stadiums may restrict the flight of drones within their airspace (i.e., a predefined space surrounding the venue) to only preauthorized drones (e.g., network television camera drones, security drones, etc.). However, in other scenarios, it is beneficial to allow a more nuanced approach (e.g., where a given drone is transporting perishable medication and where avoiding a given exclusion zone would result in the medication becoming useless). Furthermore, a public celebrity may allow (or even desire) media drones to fly onto an estate for a social event, for a period of time, for a fee.

Thus, the present invention presents a method and system that includes devices for detecting the presence of a drone that pierces a boundary in space, and based on this detection, the system triggers operations in a drone controller device. The drone controller device then takes a drone access action (e.g. charges a fee), thus creating a dynamic "drone firewall."

In various embodiments of the present invention, triggering of the drone controller device operations employs the use of a key (e.g., a private authorization signal sent from the drone to the drone controller device), a drone identifier (e.g., a unique identification signal sent from the drone to the drone controller device), or an analysis of the drone (e.g., by capturing a visual image of the drone to determine the characteristics of the drone). When analyzing the drone, a determination is made regarding the drone size, type, speed, sound, direction of flight, receiver frequency, Federal Aviation Administration (FAA) registration number and information, etc.

In an embodiment of the present invention, the drone access action may include any of: a charging of a fee, a logging of the key or unique identifier of the drone into a database, a rewarding action (e.g. an offer of a prize since someone may actually want to be filmed or have an event filmed, including an emergency operation), a changing of access to restricted functions (filming with low resolution or audio only), disabling/removing the drone, etc.

In an embodiment of the present invention in which the airspace in which the drone will be flying is fixed, the boundary of such airspace is related to the boundary of a property, yard, region of a building or window, playing area, party area, play area, concert area, etc. (horizontal space) and includes the altitude above the ground (vertical space).

In an embodiment of the present invention in which the airspace in which the drone will be flying is moving (e.g., following a car, a walking person, or other moving entity), the boundary of such airspace is related to a moving boundary around the moving entity (horizontal space) and altitude above the moving entity (vertical space). For example, assume that the security of a certain passenger of a vehicle is deemed important, if not critical (e.g., the passenger is a head of state). As such, the safety zone (horizontal and vertical) of the airspace around the moving vehicle moves along with the vehicle, such that drones are prohibited from (or limited in) entry into this safety zone, which changes as the vehicle is traveling. Similarly, if the vehicle is carrying dangerous or highly valuable cargo, a safety zone for the airspace around the vehicle moves along with the vehicle.

Figure 4:
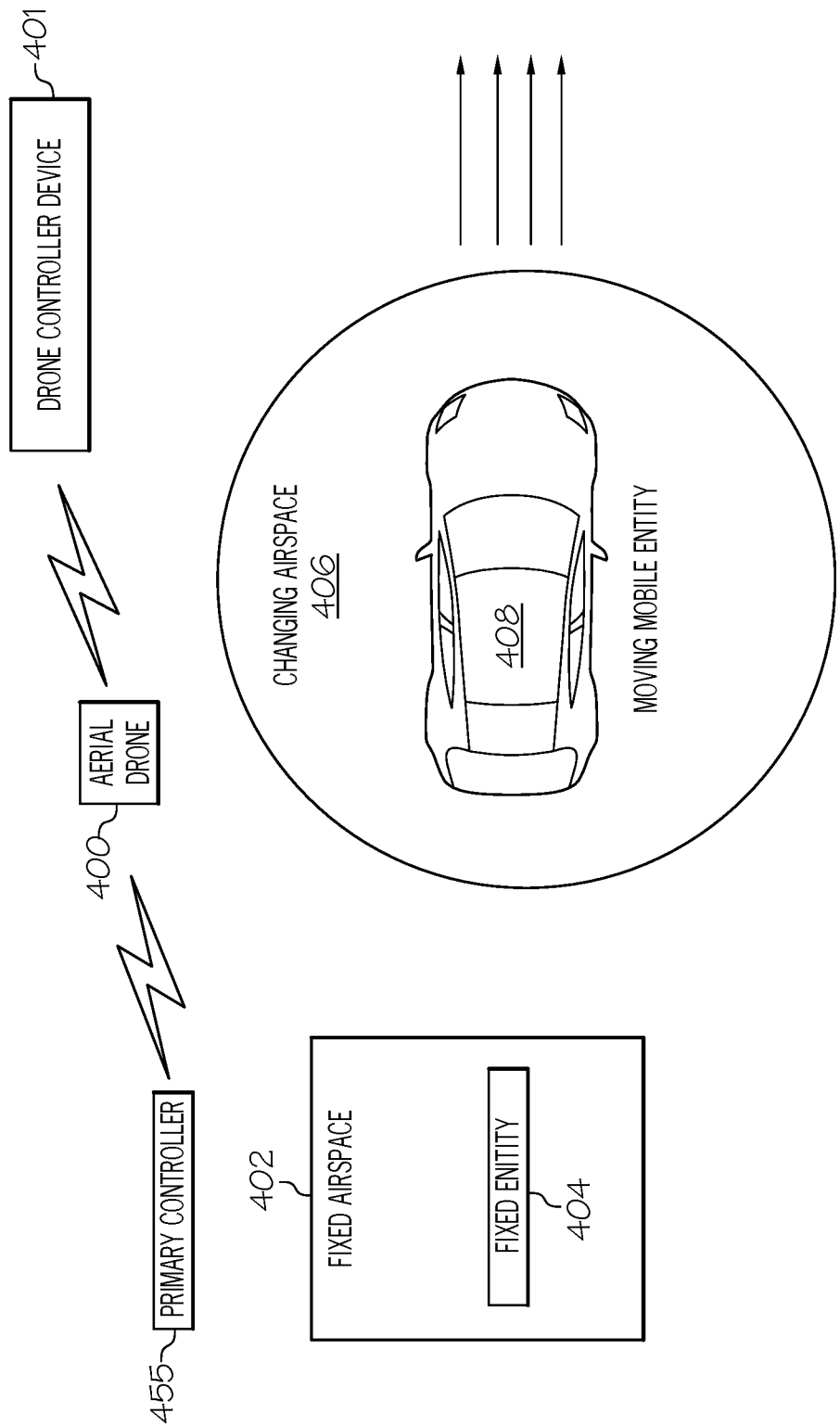
FIG. 4 depicts an aerial drone being utilized in accordance with one or more embodiments of the present invention.

Thus and with reference to FIG. 4, consider an aerial drone 400 (analogous to aerial drone 200 shown in FIG. 2) that is being monitored and/or partially controlled by a drone controller device 401 (analogous to computer 101 shown in FIG. 1). That is, although aerial drone 400 is capable of being autonomously flown or under the direction of a primary controller 455, drone controller device 401 is a secondary controller device that is able to adjust the operations of the aerial drone 400 according to certain operational parameters. More specifically, drone controller device 401 is able to control how aerial drone 400 operates within a fixed airspace 402 around a fixed entity 404 (e.g., a house) or within a changing airspace 406 around a moving mobile entity 408.

For example and in accordance with one or more embodiments of the present invention, a property owner (e.g., of the fixed entity 404) may allow a drone operator to pilot aerial drone 400 into the fixed airspace 402 of the property, but for a contractual consideration, such as a monetary payment, providing information such as email address, etc. The fee/consideration may change based on the distance from one or more specified targets (e.g. points in a 3D space). That is, if the drone operator wants to approach and/or film a first object on the property (e.g., a public pool), the property owner may only require that the drone operator identify himself/herself. However, if the drone operator wants to approach and film a second object on the property (e.g., a private residence), the property owner may require that the drone be operated in a certain mode (e.g., a "quiet" mode using the electric motor 216 shown in FIG. 2) and that the drone operator pay a monetary fee.

As shown in FIG. 4, the controlled airspace may be in a moving zone, such as the changing airspace 406 that changes as a moving mobile entity 408 moves. The exclusion zone (i.e., changing airspace 406) may include a radius R from a moving car (moving mobile entity 408) with a public figure inside the car, such that the exclusion zone moves with the car.

In an embodiment of the present invention the system, once the drone pierces the boundary (e.g. boundary of a property or area surrounding a moving entity), the drone controller device 401 shown in FIG. 4 controls the drone as if the drone were in a viscous fluid, so as to slow it down as it enters the airspace. The viscosity coefficient may change based on numerous criteria, such as the size of the drone, the amount of the "entrance fee" that has been paid to enter the airspace, the amount of sound being emitted from the drone, etc.

The force of viscosity on a small sphere moving through a viscous fluid is given by:

$$F_d = 6\pi \mu R \, V$$

where $F_d$ is the frictional force (known as Stokes' drag) acting on the interface between the fluid and the particle, $\mu$ is the dynamic viscosity, R is the radius of the spherical object, and V is the flow velocity relative to the object. A user of the drone may therefore pay a fee or agree to alter the operations of the drone in order to reduce the viscosity coefficient.

In an embodiment of the present invention, the drone barrier prevents the drone from entering the restricted airspace until the drone controller device 401 and the aerial drone 400 negotiate an agreement (e.g., the entrance fee, the characteristics of the drone while flying within the restricted airspace, etc.). In another embodiment, if the aerial drone 400 nonetheless enters the restricted airspace, alternative steps may be activated. Examples of such steps to be activated include but are not limited to the drone controller device 400 1) issuing an alert to and/or taking control of (via the drone's on-board computer 323) the aerial drone to cause the aerial drone 400 to remain outside of the restricted airspace; 2) sending an owner of the aerial drone a warning or levying a fine against the aerial drone for entering the restricted airspace; 3) photographing the aerial drone (e.g., from a camera on another authorized aerial drone within the restricted airspace) for forensic evidence if an untoward event may occur within the restricted airspace; etc.

In an embodiment of the present invention, a graphical user interface on the primary controller 455 (being used by the operator of the aerial drone 400) sketches a 2-D or 3-D virtual boundary on a map (displayed on the primary controller 455) that represents the zone of exclusion or control for the flight of the aerial drone 400. That is, a display on the primary controller 455 will show 1) the present position of the aerial drone, and 2) the restricted airspace (e.g., fixed airspace 402 and/or changing airspace 406). This display may be an image (e.g., photographic display) of the area or a map (e.g., a cartographical drawing) of the area. In an embodiment of the present invention, the restricted airspace zone is established in an automated manner using sensors and transmitters around the property. That is, transmitters around the perimeter of the restricted airspace transmit signals that define the perimeter of the property/airspace, which are received by the aerial drone 400 in order to direct the aerial drone 400 to stay out of the restricted airspace unless/until authorized.

Thus, in one embodiment the primary controller 455 and/or drone controller device 401, which are in communication with the aerial drone 400, provide a map of the environment, receive target world coordinates for the aerial drone 400 within the environment, determine a desired velocity vector to direct the aerial drone 400 to the target world coordinates at a speed proportional to the distance between the aerial drone 400 and the target world coordinates (e.g., the location of fixed entity 404 or moving mobile entity 408), and direct the aerial drone 400 along the desired velocity vector until the aerial drone 400 reaches the target world coordinates. When the drone reaches a certain target, a payment or reward may be instituted.

In various embodiments of the present invention, the restricted airspace is defined by hardware devices. For example, fixed transmitters around a perimeter of the restricted airspace may send out signals defining the physical boundary of the restricted airspace. Thus, any aerial drone capable of sensing these limited-range signals will "know" that it is entering restricted airspace. Similarly, such boundary transmitters can send out global positioning system (GPS) coordinates that identify the boundary of the restricted airspace, which are received by the aerial drone. An approaching aerial drone that is GPS-enabled will compare these boundary GPS coordinates with current real-time GPS coordinates (that identify the current location of the aerial drone) in order to determine whether or not the aerial drone is within the restricted airspace. In an alternative embodiment, the aerial drone is pre-programmed with a list/range of GPS coordinates that have been predetermined to be within restricted airspace. Thus, when an on-board GPS sensor (e.g., one of the positioning sensors 153 shown in FIG. 1 when incorporated into the on-board equipment of aerial drone 200 shown in FIG. 2) determines that the aerial drone is approaching or is within the restricted airspace, the drone on-board computer 323 will take corrective actions (e.g., steer the aerial drone out of or away from the restricted airspace, negotiate permission to enter the restricted airspace, etc.).

In an embodiment of the present invention, the aerial drone 400 has a memory (e.g., system memory 135 and/or hard drive 133 shown in FIG. 1) that is loaded with geolocation data corresponding to restricted airspace boundaries as well as the capability to autonomously assess a fee, provide a reward, or reroute the aerial drone 400 outside of the restricted airspace boundaries (or inside the airspace) as the aerial drone 400 approaches to within a predetermined distance of the restricted airspace. That is, the drone on-board computer 323 shown in FIG. 3 is able to not only know where aerial drone 400 is and where the restricted airspace is in relation to the aerial drone 400, but is also capable of autonomously negotiating permission to enter the restricted airspace by altering the operation of the aerial drone 400 (e.g., switching from use of the noisy internal combustion engine 220 to the quiet electric motor 216 shown in FIG. 2) in order to receive permission to enter the restricted airspace.

In an embodiment of the present invention, the aerial drone 400 has a back-door capability such that an exclusion zone administrator (e.g., an operator of the drone control device 401) has privileges to access a back-door capability to direct the aerial drone 400 away from the exclusion zone or define its route, based on the permission levels of the aerial drone 400.

In an embodiment of the present invention, the aerial drone 400 (more specifically the drone on-board computer 323 shown in FIG. 3) is pre-programmed with a flight plan that excludes flying through restricted airspace. That is, the aerial drone 400 can be pre-programmed to fly autonomously around, above, or below the restricted airspace, particularly at times in which the airspace is restricted. That is, some airspace is restricted at certain times (e.g., when a certain person or unit of equipment is within that area) and is unrestricted at other times (e.g., when the certain person or unit of equipment has left the area). Thus, the restricted airspace can be not only defined by geophysical locations, but also temporal (time) periods.

In an embodiment of the present invention, the drone controller device 401 monitors operations of the aerial drone 400 and identifies any anomalous behaviors (such as the drone entering the exclusion zone and staying there for a longer duration than permitted).

While the moving mobile entity 408 is depicted in FIG. 4 as a land-based (terrestrial) automobile, alternatively moving mobile entity 408 may be a boat (water-based), an airplane (e.g., a piloted aircraft), or another drone. Thus, the changing airspace 406 dynamically changes in accordance with the movement of the moving mobile entity 408.

Figure 5:
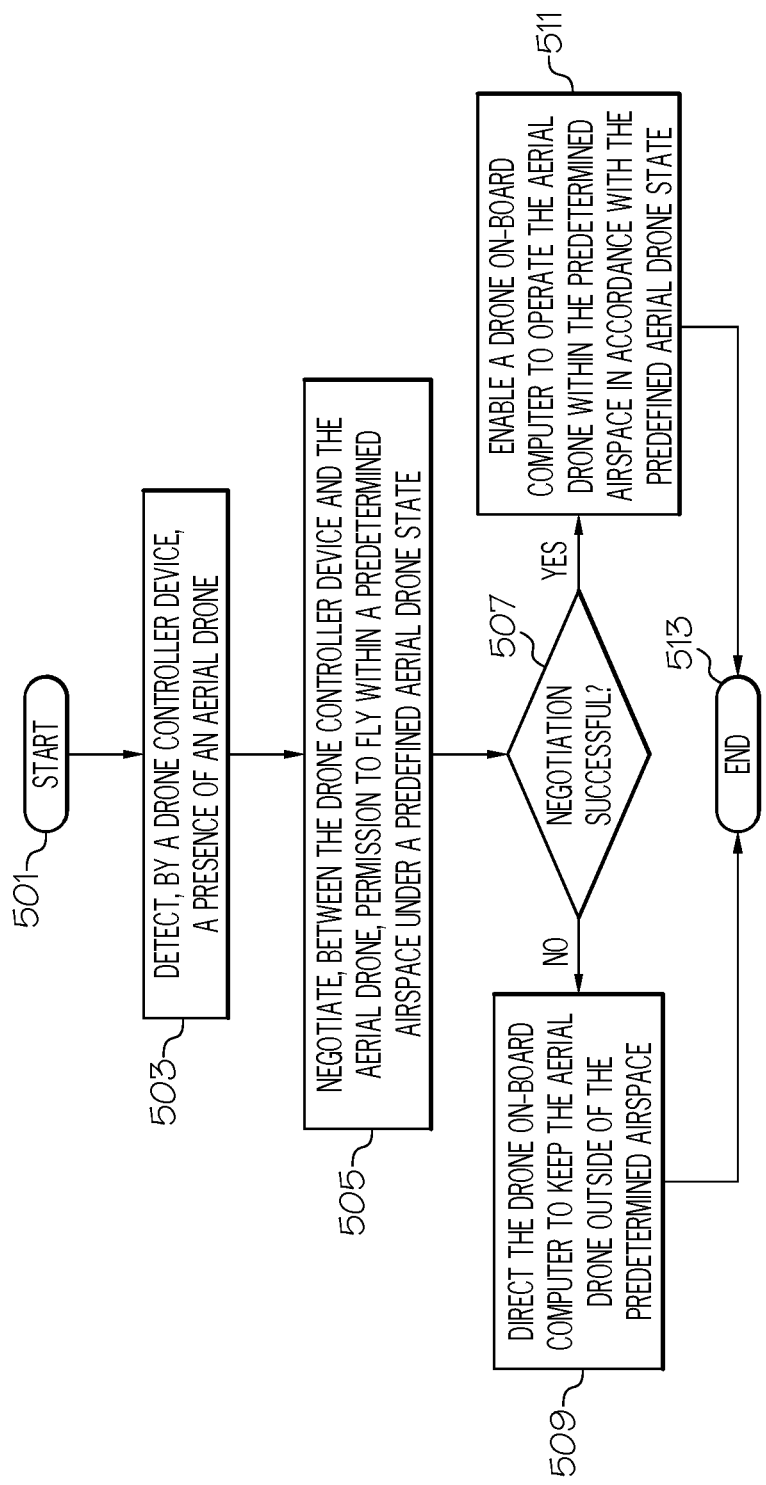
FIG. 5 is a high-level flow chart of one or more steps performed by one or more computing and/or other hardware devices to control movement of an aerial drone within a predetermined airspace in accordance with one or more embodiments of the present invention.

With reference now to FIG. 5, a high-level flow chart of one or more steps performed by one or more computing and/or other hardware devices to control movement of an aerial drone within a predetermined airspace in accordance with one or more embodiments of the present invention is presented.

After initiator block 501, a drone controller device (e.g., drone controller device 401 shown in FIG. 4) detects a presence (e.g., within a predetermined location) of an aerial drone (e.g., aerial drone 400 shown in FIG. 4), as described in block 503. For example, the drone controller device 401 may detect that the aerial drone 400 is approaching the restricted fixed airspace 402 shown in FIG. 4.

As described in block 505, the drone controller device and the aerial drone negotiate permission to fly within a predetermined airspace under a predefined aerial drone state.

For example, the predetermined airspace may be the restricted fixed airspace 402 and/or the restricted changing airspace 406 (e.g., a predetermined range of changing airspace around the moving mobile entity 408) shown in FIG. 4.

The predefined aerial drone state may be based on a financial agreement or an operational state of the aerial drone. That is, the permission to enter the restricted airspace may be based on a predefined financial agreement with an entity associated with the aerial drone. That is, if the owner and/or operator of the aerial drone agrees to pay a certain fee, then the drone controller device 401 sends a signal to the drone on-board computer 323 enabling the aerial drone 200 to enter the restricted airspace. In one embodiment, this permission is negotiated by sending a signal to a remuneration control system (e.g., computer 101 shown in FIG. 1) in order to enable a predefined financial agreement with an entity associated with the aerial drone. That is, the aerial drone 400 and/or drone controller device 401 contact computer 101 to enact the financial agreement. Computer 101 then sends an authorization signal to the aerial drone 400 and/or drone controller device 401 to direct/control/enable the aerial drone 400 to fly within the restricted airspace.

In an embodiment of the present invention, negotiation of the permission is based on an agreement that the aerial drone will perform a specified aerial maneuver for an entity associated with the predetermined airspace. For example, an owner of the property below the restricted fixed airspace 402 may agree to let the aerial drone 400 enter the fixed airspace 402 only if the aerial drone 400 is instructed to perform a specified aerial maneuver, such as sending a photograph of fixed entity 404 to the owner of the property, performing aerobatic "tricks" with the aerial drone 400 for the amusement of guests of the owner of the property, broadcasting aural warnings from speaker 311 (see FIG. 3) to scare away predators, etc.

In an embodiment of the present invention, the negotiated permission is based on characteristics of the aerial drone.

For example, assume that the aerial drone 400 is photographed by the drone controller device 401, which determines that the aerial drone 400 has a width (e.g., rotor wingspan) of 4 feet. If this is larger than what the property owner is comfortable with, then an additional fee may be charged, operational characteristics of the drone may be altered, etc.

Thus, in this or another embodiment, the permission to enter the restricted airspace is based on a noise level generated by the aerial drone. That is, assume that microphone 317 in FIG. 3 detects a noise level of 110 dB being emitted by the aerial drone 200 when using the internal combustion engine 220 shown in FIG. 2 as the propulsion power source for the aerial drone 200. The drone controller device 401 may 1) prevent the aerial drone 400 from entering the restricted airspace or 2) charge a higher fee for the aerial drone 400 to enter the restricted airspace unless the drone on-board computer 223 shuts down the internal combustion engine 220 and uses the electric motor 216 (which has been predetermined to generate less than a predefined noise level, such as 80 dB).

In an embodiment of the present invention, the permission to enter the restricted airspace is based on an amount of light being emitted by the aerial drone. For example, assume that lights 309 shown in FIG. 3 in aerial drone 200 are spotlights. The owner of the restricted airspace may be willing to allow the aerial drone 400 shown in FIG. 4 to fly within the restricted fixed airspace 402 or restricted changing airspace 406, with or without charging a fee, but only if the lights 309 are turned down (or even off) to a level that is acceptable to the owner of the restricted airspace (thus not distracting the operator of the moving mobile entity 408, annoying inhabitants of the fixed entity 404, etc.). Alternatively, the owner of the restricted airspace may be willing to allow the aerial drone 400 shown in FIG. 4 to fly within the restricted fixed airspace or restricted changing airspace 406, with or without charging a fee, but only if the lights 309 are turned up to a high level that illuminates the property/vehicle and/or visually identifies the presence of the aerial drone 400.

In an embodiment of the present invention, the permission to enter the restricted airspace is based on a speed of the aerial drone. That is, if the aerial drone is traveling at (or alternatively simply has the capability of traveling at) a high speed (e.g., more than 30 miles per hour), then this may pose a safety threat that is worrisome to the owner of the property/vehicle to be overflown by the aerial drone 400. As such, the drone controller device 401 will enable the drone on-board computer 323 to fly the aerial drone 400 into the restricted airspace only if 1) the speed of the aerial drone 400 is reduced (e.g., below 10 miles per hour) or 2) a higher fee to enter the restricted airspace is paid (e.g., to a third party financial payment—not shown).

Alternatively, the owner of the property may want the aerial drone to be overhead for as short a time as possible (e.g., less than 15 seconds). Thus, if the aerial drone is traveling slowly (e.g., less than 2 miles per hour), then it will be overhead for a long time (e.g., more than 10 minutes). As such, the drone controller device 401 will enable the drone on-board computer 323 to fly the aerial drone 400 into the restricted airspace only if 1) the speed of the aerial drone 400 is increased (e.g., above 30 miles per hour) or 2) a higher fee to enter the restricted airspace is paid in order to fly at the slower speed.

In one or more embodiments, these negotiations to obtain permission to fly within the predetermined airspace are performed before the aerial drone enters the predetermined airspace.

Returning to FIG. 5, a query (query block 507) is made as to whether the drone controller device 401 and the aerial drone 400 have been successful in negotiating permission for the aerial drone 400 to enter the restricted airspace.

If not (block 509), then the drone controller device 401 sends a control signal to the drone on-board computer 323 (shown in FIG. 3) to fly the aerial drone around the restricted airspace, and the process ends (terminator block 513).

However, if the negotiation is successful (block 511), then the drone controller device 401 enables (e.g., directs) the drone on-board computer 323 to operate the aerial drone within the predetermined airspace in accordance with the predefined aerial drone state (e.g., using the electric motor, turning drone lights on/off, flying at a certain speed, receiving a fee payment, etc.).

In an embodiment of the present invention, the aerial drone 400 and/or the primary controller 455 send a message to the drone controller device 401 identifying a planned destination (e.g., a house such as fixed entity 404) of the aerial drone 400. The drone controller 401 will then send (assuming that the aerial drone has permission to enter the restricted fixed airspace 402) the aerial drone 400 directions to the planned destination.

In an embodiment of the present invention, the aerial drone 400 may be authorized to enter restricted airspace but to only use certain on-board equipment. For example, assume that aerial drone 400 is equipped with both the camera 326 and the sensors 315 shown in FIG. 3. Assume further that the sensors 315 are only chemical sensors, and that the owner/occupier of the restricted airspace has no problem with the aerial drone 400 taking chemical sensor readings, but does not want the aerial drone 400 to be photographing objects on the land or otherwise associated with the restricted airspace. As such, the drone controller device 401 can send a signal to the drone on-board computer 323 in the aerial drone 400 that 1) enables the sensors 315 and disables the camera 326 while the aerial drone 400 is within the restricted airspace (e.g., fixed airspace 402).

The present invention may be implemented in one or more embodiments using cloud computing. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
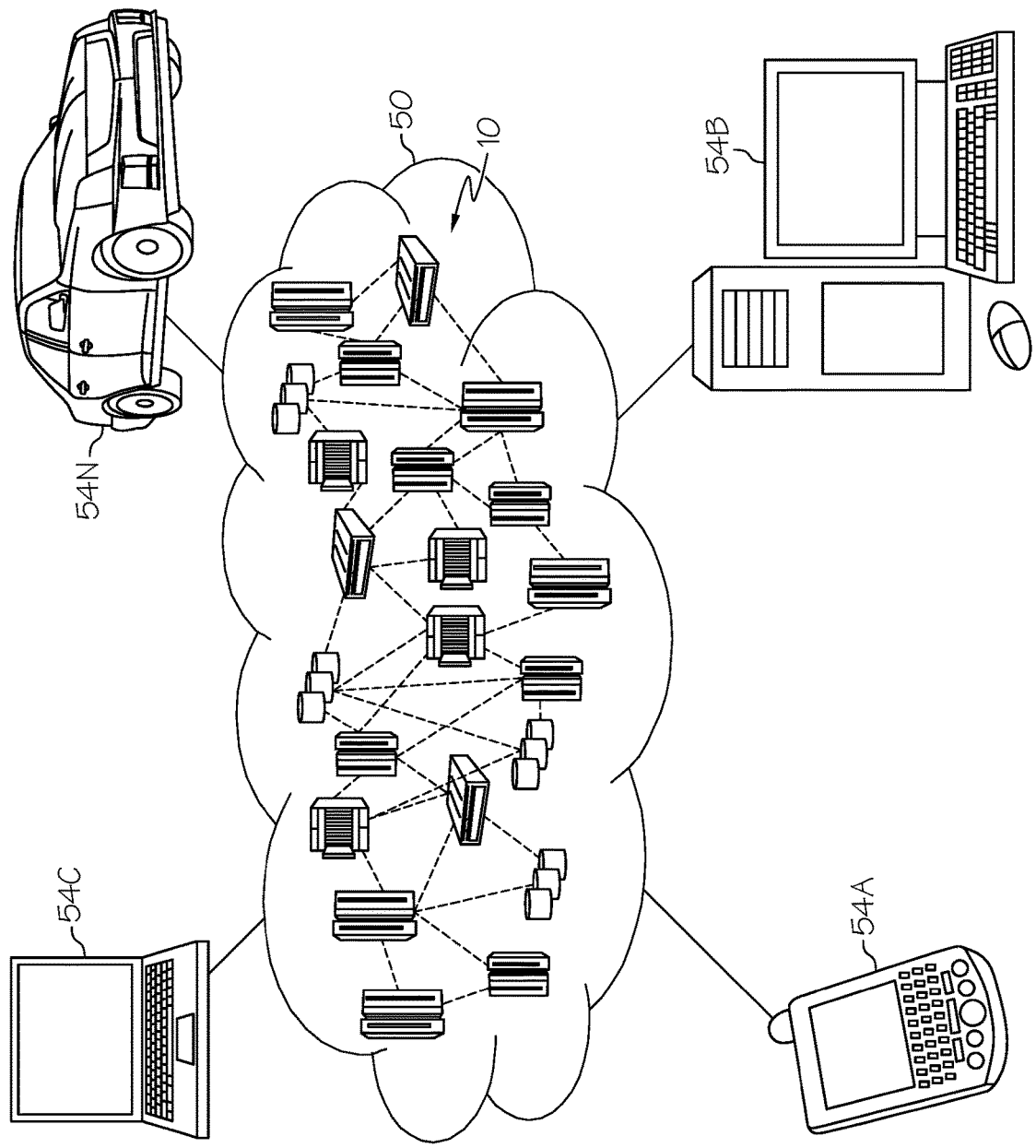
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 6 are intended to be illustrative only and that computing nodes 10 and cloud computing environment 50 can communicate with any type of computerized device over any type of network and/or network addressable connection (e.g., using a web browser).

Figure 7:
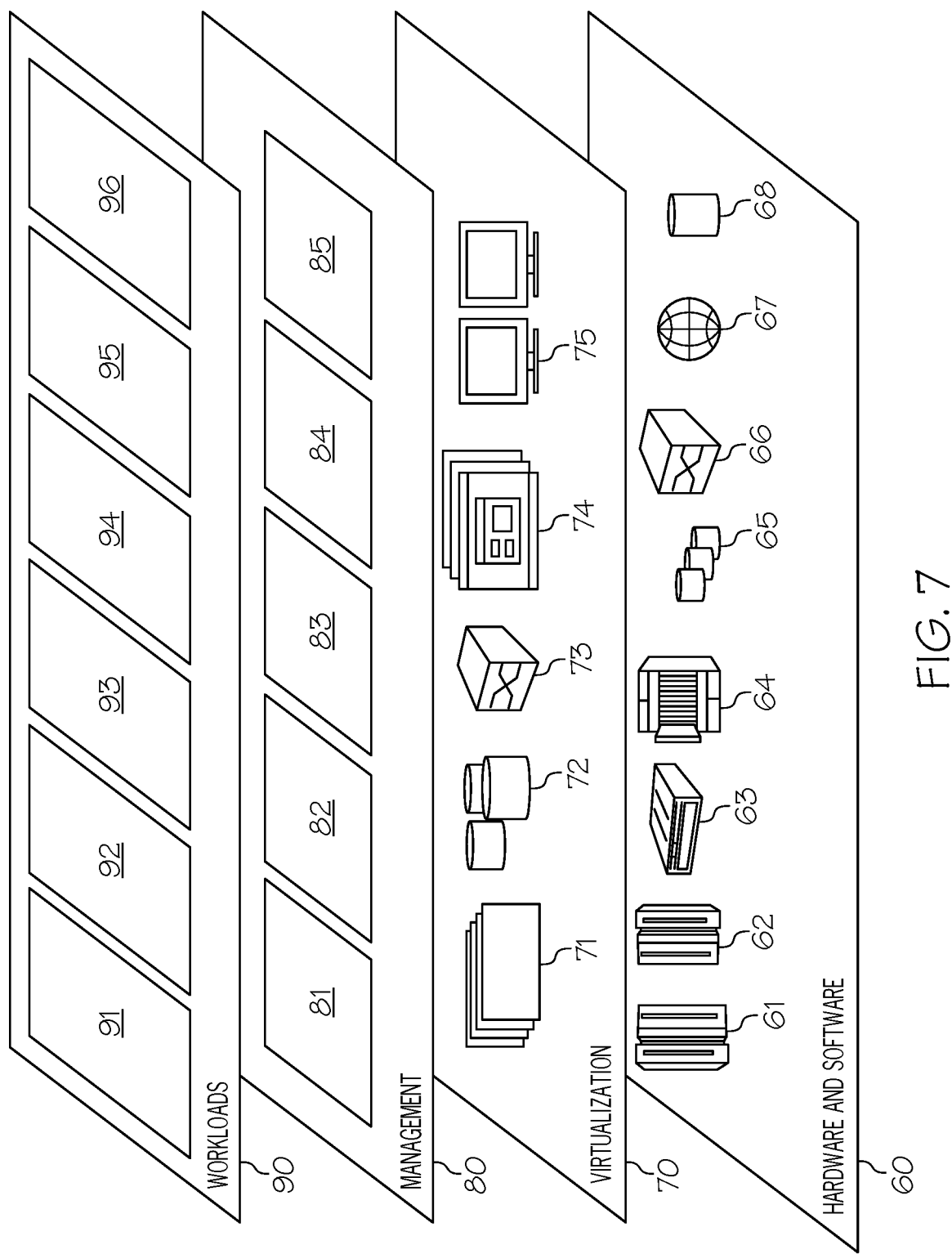
FIG. 7 depicts abstraction model layers of a cloud computer environment according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and drone control processing 96.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to

What is claimed is:

1. A method comprising:
    detecting, by a drone controller device, a presence of an aerial drone;
    negotiating, between the drone controller device and the aerial drone, permission to fly within a predetermined airspace under a predefined aerial drone state, wherein the predefined aerial drone state is an operational state of the aerial drone;
    in response to successfully negotiating the permission, the drone controller device enabling a drone on-board computer to operate the aerial drone within the predetermined airspace in accordance with the predefined aerial drone state;
    determining that a light on the aerial drone is currently producing more than a predefined amount of light; and
    in response to determining that the light on the aerial drone is currently producing more than a predefined amount of light, allowing the aerial drone to continue to operate within the predetermined airspace.

2. The method of claim 1, further comprising:
    transmitting, from the aerial drone to the drone controller device, a private authorization signal that triggers the drone controller device enabling the drone on-board computer to operate the aerial drone within the predetermined airspace.

3. The method of claim 1, wherein the predetermined airspace is around a moving vehicle, and wherein the method further comprises:
    determining, by the drone controller, that the moving vehicle is carrying a payload of dangerous cargo; and
    in response to determining that the moving vehicle is carrying the payload of dangerous cargo, maintaining a predetermined minimum distance between the aerial drone and the moving vehicle.

4. The method of claim 1, further comprising:
    detecting, by the drone controller device, that the aerial drone has entered the predetermined airspace; and
    in response to detecting that the aerial drone has entered the predetermined airspace, directing, by the drone controller device, the aerial drone to decelerate based on a physical size of the aerial drone.

5. The method of claim 1, further comprising:
    negotiating, by one or more processors, the permission based on an agreement that the aerial drone will perform a specified aerobatic trick within the predetermined airspace.

6. The method of claim 1, wherein the method further comprises: determining a noise level generated by the aerial drone is greater than a predetermined level due to the aerial drone being propelled by an internal combustion engine; and in response to determining that the noise level generated by the aerial drone is greater than the predetermined level, shutting down the internal combustion engine and turning on an electric motor to propel the aerial drone.

7. The method of claim 1, further comprising:
    allowing the aerial drone to operate with the predetermined airspace only if the aerial drone operates at a speed that is greater than a predefined speed.

8. The method of claim 1, further comprising:
    enabling a chemical sensor on the aerial drone while disabling a camera on the aerial drone while the aerial drone is operating within the predetermined airspace.

9. A method comprising:
    detecting, by a drone controller device, a presence of an aerial drone;
    negotiating, between the drone controller device and the aerial drone, permission to fly within a predetermined airspace under a predefined aerial drone state, wherein the predefined aerial drone state is an operational state of the aerial drone;
    in response to successfully negotiating the permission, the drone controller device enabling a drone on-board computer to operate the aerial drone within the predetermined airspace in accordance with the predefined aerial drone state; and
    enabling a chemical sensor on the aerial drone while disabling a camera on the aerial drone while the aerial drone is operating within the predetermined airspace.

10. A computer system comprising one or more processors, one or more computer readable memories, and one or more computer readable storage mediums, and program instructions stored on at least one of the one or more computer readable storage mediums for execution by at least one of the one or more processors via at least one of the one or more computer readable memories, the stored program instructions comprising:
    program instructions to detect a presence of an aerial drone;
    program instructions to negotiate permission to fly within a predetermined airspace under a predefined aerial drone state, wherein the predefined aerial drone state is an operational state of the aerial drone;
    program instructions to, in response to successfully negotiating the permission, enable a drone on-board computer to operate the aerial drone within the predetermined airspace in accordance with the predefined aerial drone state; and
    program instructions to enable a chemical sensor on the aerial drone while disabling a camera on the aerial drone while the aerial drone is operating within the predetermined airspace.

11. The computer system of claim 10, further comprising:
    program instructions to detect a moving mobile entity; and
    program instructions to define the predetermined airspace as a predetermined range of changing airspace around the moving mobile entity.

12. The computer system of claim 10, further comprising:
    program instructions to negotiate the permission by sending a signal to a remuneration control system in order to enable a predefined financial agreement with an entity associated with the aerial drone.

* * * * *